Figure 1:
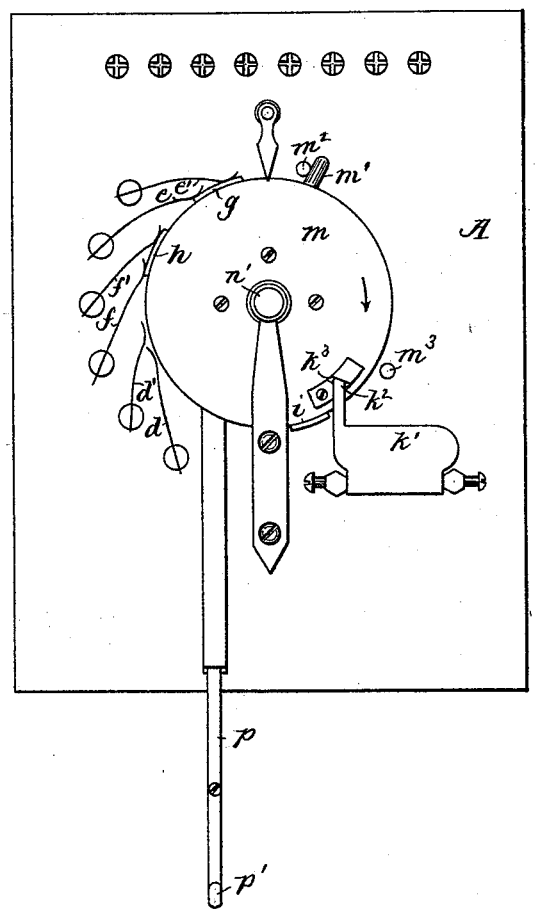

(No Model.) 2 Sheets—Sheet 1.

M. MARTIN.
CIRCUIT FOR ELECTRIC SIGNALING.

No. 454,974. Patented June 30, 1891.

Witnesses,
Jas. J. Maloney.
A. J. Locke.

Inventor,
Morris Martin,
by Jno. P. Livermore

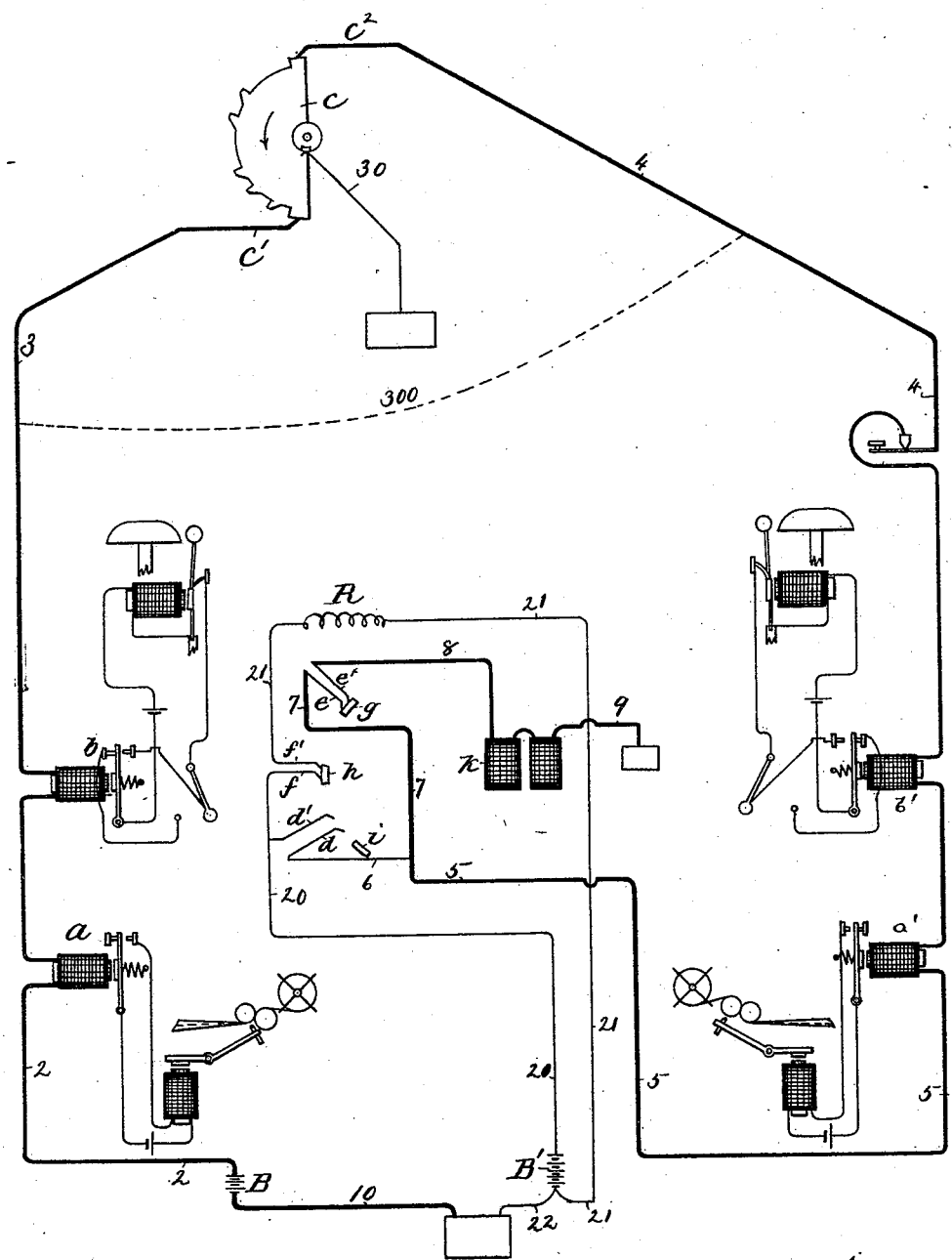

UNITED STATES PATENT OFFICE.

MORRIS MARTIN, OF MALDEN, ASSIGNOR TO FREDERICK P. FISH, OF CAMBRIDGE, MASSACHUSETTS.

CIRCUIT FOR ELECTRIC SIGNALING.

SPECIFICATION forming part of Letters Patent No. 454,974, dated June 30, 1891.

Application filed November 5, 1888. Serial No. 289,962. (No model.)

*To all whom it may concern:*

Be it known that I, MORRIS MARTIN, of Malden, county of Middlesex, and State of Massachusetts, have invented an Improvement in Circuits for Electric Signaling, of which the following description, in connection with the accompanying drawings, is a specification, like letters and figures on the drawing representing like parts.

My invention relates to a circuit for electric signaling and may be employed for fire-alarm signaling apparatus, the object being to enable a signal to be transmitted from a box or out-station to a main office or receiving-station after the circuit has become deranged either by being actually broken at some point or having a ground connection upon it. Letters Patent No. 341,115 to J. C. Wilson, dated May 4, 1886, show and describe a circuit of this character in which the main line passes as a metallic circuit from the main or receiving station through the out or transmitting stations, but has both terminals grounded in the main station, and the part leading from the main station in each direction from the grounded connection contains a battery and signal-receiving instrument. The signals are normally transmitted from the out-stations by opening or severing the line and connecting first one and then the other end thereof with the ground and transmitting the signals in said grounded circuit in any usual manner. The batteries are arranged in opposition to one another and are of unequal amount, so that there is always a small current flowing over the line when the latter is intact, and the cessation of such small current will show a breakage in the line, while an increase in the current will indicate that a ground connection has come upon the line which makes each battery operate in an independent circuit unopposed by the other.

The present invention is intended as an improvement on that just described, having the same general mode of operation so far as the transmission of signals is concerned, but removing certain objections that are found to exist in the practical operation of the circuit shown and described in said patent. The main objection to be overcome is the effect of opposing the batteries to very quickly consume the copper connection of the weaker battery, which thus requires almost constant attention.

The present invention consists, mainly, in providing an automatic circuit-changer or shifting device, which when the line is in normal condition—namely, unbroken—and having no ground connections upon it merely completes a main circuit through one battery and receiving-instrument and all the out-stations, and at the same time retains another battery closed in a local circuit containing a high resistance, so as to prevent rapid consumption of said battery, which might be, if desired, kept in a wholly-open circuit. The said shifting device is controlled by an electro-magnet in the main circuit, which has its terminals grounded between said magnet and the battery, so that either a break in the circuit or a ground coming upon it will demagnetize said magnet and permit the circuit-changer to be moved by any suitable force or motor acting on it, such as a weight or spring. The circuit-changer when thus shifted immediately puts the two batteries and main line into substantially the condition in which the said batteries and line are normally kept in the arrangement of the circuits shown in Patent No. 341,115, before referred to, or in other words places the battery which was originally in open or local circuit in the main circuit, so that each terminal of the main line entering the main office is grounded through independent receiving-instruments and batteries, and may thus be worked as two separate ground-circuits from an out-station, so that the signal will be received in one of said circuits even if the other one is broken or disabled in some manner.

Figure 2:
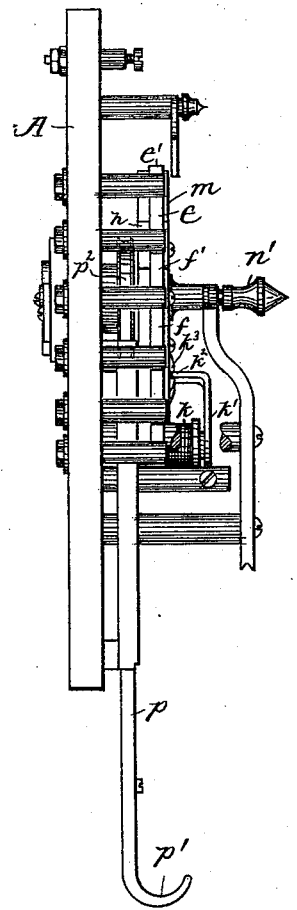
Figure 3:
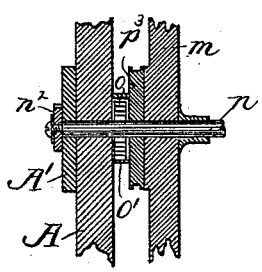
Figure 4:
Figure 5:
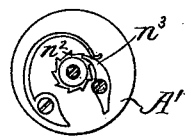

Figure 1 is a front elevation of the shifting-instrument at the main office for controlling the circuit in accordance with this invention; Fig. 2, a side elevation of said instrument; Figs. 3, 4, and 5, details to be referred to; and Fig. 6, a diagram of the circuit, the heavy lines showing the normal condition of the circuit and the lighter lines showing the additional parts that are called into operation after the circuit has been disabled at any point or while a signal is being transmitted.

As the invention consists, mainly, in the arrangement of the circuits and means for shifting them rather than in the mechanical construction of the instruments by which the circuits are changed, the main diagram, Fig. 6, will first be described. The main line, including the battery B at the main station, extends from one pole of said battery, as shown at 2, through one or more relays $a\ b$ for receiving the messages or indicating the presence or absence of current upon the line, and thence, as shown at 3, to the out-stations, each of which contains a transmitter or break-wheel $c$, which normally forms a connection between the spring-terminal $c'$ of the line entering the station and the spring-terminal $c^2$ of the line leaving the station, as shown at 4, which continues on and again enters the main office and passes through other relays $a'\ b'$, similar to the ones $a\ b$, from which it is continued, as shown at 5, to a point where it branches, one portion 6 connecting with a contact-spring $d$ and the other portion 7 connecting with a contact-spring $e$, which is normally connected by a conducting-piece $g$ with a conductor 8, leading to one terminal of an electro-magnet $k$, the other terminal of which is grounded, as shown at 9, while the opposite terminal of the battery B from the one connected with the line 2 is grounded, as shown at 10, so that the said battery is in a normally-closed main-line circuit, including the relays at the main office and all the break-wheels at the signal-boxes or out-stations and the magnet $k$, the said main-line circuit having both its terminals 9 and 10 grounded at the main office. By this arrangement it will be seen that a break in the line or a ground connection coming upon it anywhere outside of the main office will demagnetize the magnet $k$, which controls the shifting device, of which the springs $d$ and $e$ and the connector $g$ form a part. There is also at the main office a second battery B', having one terminal 20, connected with a spring $d'$, and also with a spring $f$, which spring $f$ is normally connected by a contact $h$ with a wire 21, including resistance R, and extending to the other terminal of the battery B', which is also connected with the ground, as shown at 22.

The springs $d\ d'$ are normally disconnected and the contacts $g$, $h$, and $i$ are movable and depend for their movement upon the condition of the magnet $k$, being retained in the position shown in the diagram while the said magnet is energized, and being moved automatically the moment that the said magnet is demagnetized into such position as to leave the springs $e\ e'$ and $f\ f'$ disconnected, but to connect the springs $d$ and $d'$.

The construction of the shifting device by which the contacts $g$, $h$, and $i$ are moved is shown in Figs. 1 to 5 and will be described later on, it not being essential, however, to the invention that any especial mechanical construction should be adopted. When the position of the contacts $g$, $h$, and $i$ with relation to the springs has been changed, as last described, the terminal 5 of the main line will be disconnected at $e\ e'$ from the portion 8 9 of the original or normal circuit of the battery B and will be connected at $d\ d'$ with the wire 20, leading to the battery B', the branch 21 from which will then be in open circuit at $f'$, and the working-circuit may now be traced as follows: Beginning at the ground at the main office, it passes by wire 10 to the battery B, thence by wire 2 through the relays $a\ b$ and to the out-stations, from which it returns by wire 4 through the relays $a'\ b'$, and continues thence by wires 5 6 20 to the battery B' and by wire 22 to the ground, so that if a ground connection now be placed on the main line at any point there will be two independent grounded circuits from the main office to the said grounded point, one through the battery B and relays $a\ b$ and the other through the battery B' and relays $a'\ b'$. The signals are normally transmitted in one or the other of these circuits by the break-wheel $c$, as follows: The moment the said break-wheel moves from its normal position shown in the drawings it makes contact with a branch 30, connected with the ground. Assuming that the wheel rotates in the direction of the arrow, it will during the first half-rotation leave the spring $c^2$ and portion 4 of the main circuit open, but will complete a circuit from the portion 3 of the main line by the spring $c'$ through the break-wheel and branch 30 to the ground, opening and closing the said circuit as the notches and teeth of the wheel pass under the spring in the usual manner and thus operating the relay $a$ in the circuit 10 2 3 30. In the second half-rotation from the position shown the break-wheel will leave the spring $c'$ and side 3 of the main circuit open, but will connect the side 4 and spring $c^2$ with the ground branch 30, producing the same series of breaks in the circuit 22, B', 20, 6, 5, and 4 through the relay $a'$ that were produced in the relay $a$ during the first half-rotation, so that the same signal will be received first by the relay $a$ and then by the relay $a'$ if the lines are in normal operative condition, and if either side of the said line is disabled, either by being grounded or broken, the signal will still be transmitted properly on the side that is not disabled.

If there were a cross-connection between the portions 3 4 of the main line at either side of the transmitter, as indicated at 300, the grounding of the line between said cross-connections would make two complete circuits, each receiving the current of the corresponding battery, so that the signals of the break-wheel $c$, with either the spring $c'$ or $c^2$, would cause both relays at $a'$ to operate simultaneously. If an accidental ground connection should come upon the line, the circuit-changer at the main station would be moved the same as when the ground is applied in the normal operation of the break-wheel $c$; but it would be known that it was an accidental ground, as the relays $a$ and $a'$ would not operate the same as when a signal was received, and the same would happen if the line should break at any point.

The instrument by which the changes in circuit-connection are made at the central office upon the breaking or grounding of the line will now be described, the said instrument being believed to be novel in construction and forming part of the invention, although that portion of the invention which relates to the general arrangement of the circuit is not limited to the specific mechanical construction shown of said circuit-changing instrument. The said instrument comprises a wheel or disk $m$, loosely supported on a spindle $n$ (see Fig. 3) and acted upon by a spring $o$, (see Figs. 3 and 4,) one end of which is connected with the said spindle $n$ and the other end with the disk $m$, being contained within and attached to a cylinder $o'$, fastened to said disk. The spring $o$ tends to turn the disk in the direction of the arrow, Fig. 1, and its movement in each direction is limited by a stop projection $m'$ on the disk and two co-operating stop projections $m^2$ $m^3$ on the main base or frame-work A of the instrument. A slide-rod $p$, provided with a handle or finger-hook $p'$ and connected by a flexible strip $p^2$ (see Fig. 2) with a drum or pulley $p^3$, fastened to the disk $m$, serves to set the disk back to its normal position against the stop $m^2$, as shown in Fig. 1. The disk is normally held in this position by a detent consisting of a shoulder-piece $k^3$, engaged by a finger $k^2$, projecting from the armature $k'$ of the magnet $k$, which, as before stated, is included in the normal main circuit next the grounded terminal thereof remote from the battery. The moment the armature of said magnet is released the disk $m$ is thrown suddenly by the spring $o$ as far as permitted by the stop $m^3$, such movement removing the connecting-pieces $g$ and $h$ from beneath the pairs of springs $e$ $e'$ and $f$ $f'$, which they normally connect, and bringing the connecting-pieces into position to connect the springs $d$ $d'$, which are normally separated.

The tension of the spring $o$ may be adjusted to make the movement of the disk $m$ sufficiently prompt and sudden by turning the spindle $n$, which is provided with a suitable knob $n'$, (see Fig. 2,) and also has connected with it a ratchet $n^2$, (see Fig. 5,) controlled by a pawl $n^3$, fastened to the frame-work A or to a plate or washer $A^*$ fixed thereon, so that the spring may be wound or strained like a clock-spring. In the normal condition of the circuit the disk will be retained in the position shown in Fig. 1; but the instant said circuit is broken or grounded by the first change produced by the break-wheel $c$ the disk is released and immediately makes the circuit into practically two independent grounded circuits, as before stated, the signal being transmitted first in one and then in the other of said circuits. After the signal has been received the disk should be set back to its original position by pulling down the slide-rod $p$; but if this resetting should be neglected the circuit would still remain operative for any other signal that might subsequently come in. If the disk should be released by an accidental break or grounding of the line, the detent would not hold it when restored by the slide-rod $p$, and the circuit would thus remain in two separate parts, each containing its own battery and receiving-instruments until the line could be repaired, and the line would operate to transmit the signal to the relay on the side of the break-wheel at which the line is unbroken.

The batteries B B' are arranged with opposing poles to the line in order that if there should be a cross-connection, as indicated at 300, around the transmitting-point, the batteries will oppose one another when the ground is removed, as by a notch in the transmitting break-wheel, and thus produce a sufficient variation from the current strength of the batteries when acting in two separate ground-circuits to operate the relays $a$ $a'$, and the said batteries may be made slightly unequal in order to indicate a break in the line if the apparatus is standing for any length of time with the circuit-changer shifted from its normal position.

I claim—

1. The combination of a battery having one pole grounded, a main circuit extending from said battery and having its terminal grounded at the same station as said battery, and receiving-instruments in said circuit, one near each grounded terminal thereof, with a second battery normally disconnected from said main circuit, a movable circuit-shifter and electro-magnet governing the movement of the said shifter and included in the said main circuit, the said shifter comprising contacts connected in circuit with both said batteries, which, when the shifter is operated upon a change of condition of its controlling-magnet, introduces and retains the said second battery in the main circuit between the ground and the terminal of said main circuit remote from the first-mentioned battery, whereby the circuit is capable of operating as two independent ground-circuits, each containing a battery and receiving-instrument, substantially as and for the purpose described.

2. The combination of a normally-closed main circuit including a battery and having both terminals grounded at the battery-station with a movable circuit-shifter normally acted upon by a force that tends to change its position, an electro-magnet and armature therefor constituting a detent that restrains such movement of the shifter, said magnet being included in the main circuit near the ground terminal most remote from the battery, so as to be shunted by a ground connection on the line, a second battery of different amount from that in the main circuit normally disconnected from the said main circuit when the shifter is held by its detent, and contacts forming part of the said shifter and connected with both said batteries, by which the second battery is introduced into the main circuit in position to oppose the main battery, with a ground connection between said batteries, substantially as described.

3. A main battery having one terminal grounded and a main circuit leading therefrom and connected near its end remote from the battery with one member of a normally-open circuit-closer, and also connected through a normally-closed circuit-breaker to the ground, combined with a second battery having one pole grounded and its other pole connected with the other member of the before-mentioned normally-open circuit-closer, the said circuit closer and breaker constituting part of a movable shifter, which when operated closes the former and opens the latter, thereby removing the original ground connection from the main circuit and grounding said circuit through the second battery, whereby both batteries are included in a metallic circuit having a ground connection between said batteries, substantially as described.

4. The combination of a disk acted upon by a force tending to rotate the same with stops limiting said rotary movement, an electromagnet and armature therefor co-operating with said disk and constituting a detent opposing its movement, and electric contacts co-operating with said disk, the said disk when released by its detent having an unretarded movement, whereby it makes a prompt change in the electric connection of said contacts unaffected by further change in condition of said detent, substantially as described.

In testimony whereof I have signed my name to this specification in the presence of two subscribing witnesses.

MORRIS MARTIN.

Witnesses:
JOS. P. LIVERMORE,
JAS. J. MALONEY.